(12) United States Patent
Tran

(10) Patent No.: US 7,642,917 B2
(45) Date of Patent: Jan. 5, 2010

(54) ANTENNA ARRANGEMENT

(75) Inventor: Tu Tran, Marseilles (FR)

(73) Assignee: Tagsys (FR)

( * ) Notice: Subject to any disclaimer, the term of this patent is extended or adjusted under 35 U.S.C. 154(b) by 299 days.

(21) Appl. No.: 11/793,868

(22) PCT Filed: Dec. 21, 2005

(86) PCT No.: PCT/FR2005/003233

§ 371 (c)(1),
(2), (4) Date: Jul. 25, 2007

(87) PCT Pub. No.: WO2006/067336

PCT Pub. Date: Jun. 29, 2006

(65) Prior Publication Data

US 2008/0088449 A1    Apr. 17, 2008

(30) Foreign Application Priority Data

Dec. 21, 2004    (FR) .................................. 04 53126

(51) Int. Cl.
*G08B 13/14* (2006.01)
(52) U.S. Cl. .................. 340/572.7; 340/572.1
(58) Field of Classification Search ............ 340/572.1, 340/572.5, 572.7, 572.9; 343/741, 742, 842; 235/385

See application file for complete search history.

(56) References Cited

U.S. PATENT DOCUMENTS

| | | | | |
|---|---|---|---|---|
| 3,689,885 A | | 9/1972 | Kaplan et al. | |
| 4,016,553 A | * | 4/1977 | Novikoff et al. | 340/572.7 |
| 4,243,980 A | * | 1/1981 | Lichtblau | 340/572.7 |
| 4,751,516 A | * | 6/1988 | Lichtblau | 343/742 |
| 4,798,175 A | | 1/1989 | Townsend et al. | |
| 4,866,455 A | * | 9/1989 | Lichtblau | 343/742 |
| 5,572,226 A | | 11/1996 | Tuttle | |
| 6,696,954 B2 | | 2/2004 | Chung | |
| 6,700,547 B2 | | 3/2004 | Mejia et al. | |
| 6,703,935 B1 | * | 3/2004 | Chung et al. | 340/572.7 |
| 6,943,688 B2 | * | 9/2005 | Chung et al. | 340/572.7 |
| 2002/0044096 A1 | | 4/2002 | Chung | |
| 2003/0209601 A1 | | 11/2003 | Chung | |

FOREIGN PATENT DOCUMENTS

WO    WO 95/14938 A1    6/1995
WO    WO 99/50780 A1    10/1999

* cited by examiner

*Primary Examiner*—Van T. Trieu
(74) *Attorney, Agent, or Firm*—DLA Piper LLP (US)

(57) ABSTRACT

A network of antennas for contactless reading or writing of RFID tags in a detection volume, including three or four flat, independent antennas sequentially connected to a single reader by a switch, wherein planes of the antennas pass through a reading/writing/detection volume centered in the detection volume, for every pair of antennas, an intersection of their planes is included in the optimal reading/writing volume, and the antennas are arranged so that any direction in the optimal reading/writing volume forms an angle of about 45° or less with at least one of the planes of the antennas.

14 Claims, 10 Drawing Sheets

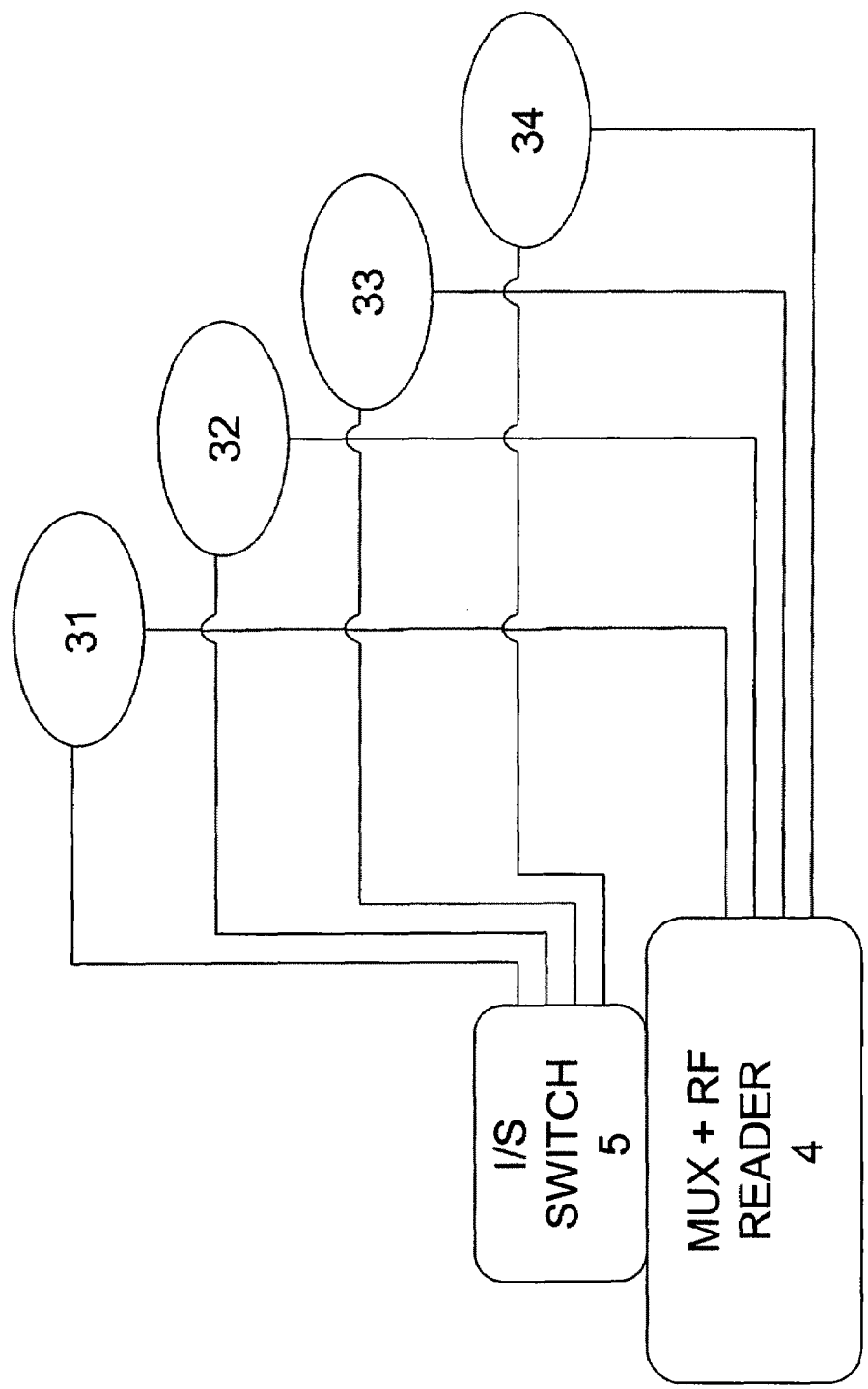

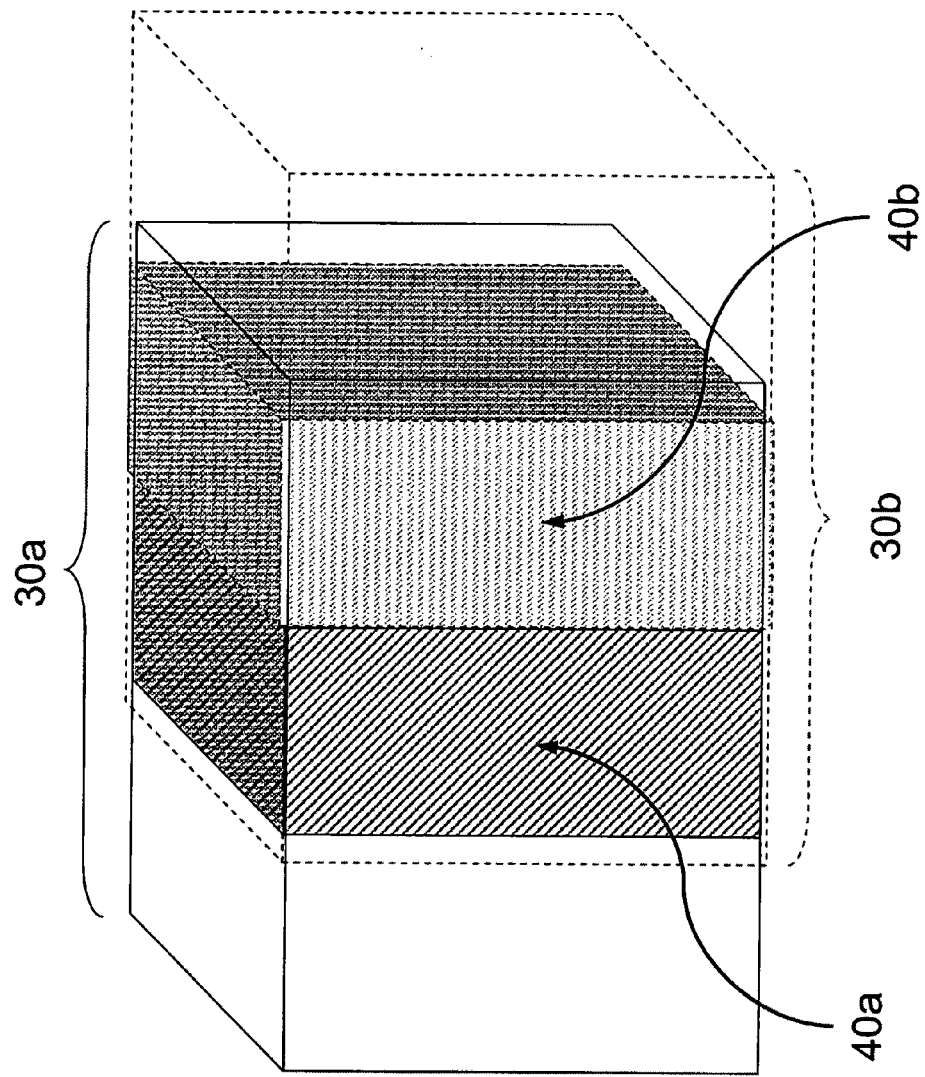

85
Optimal detection volume

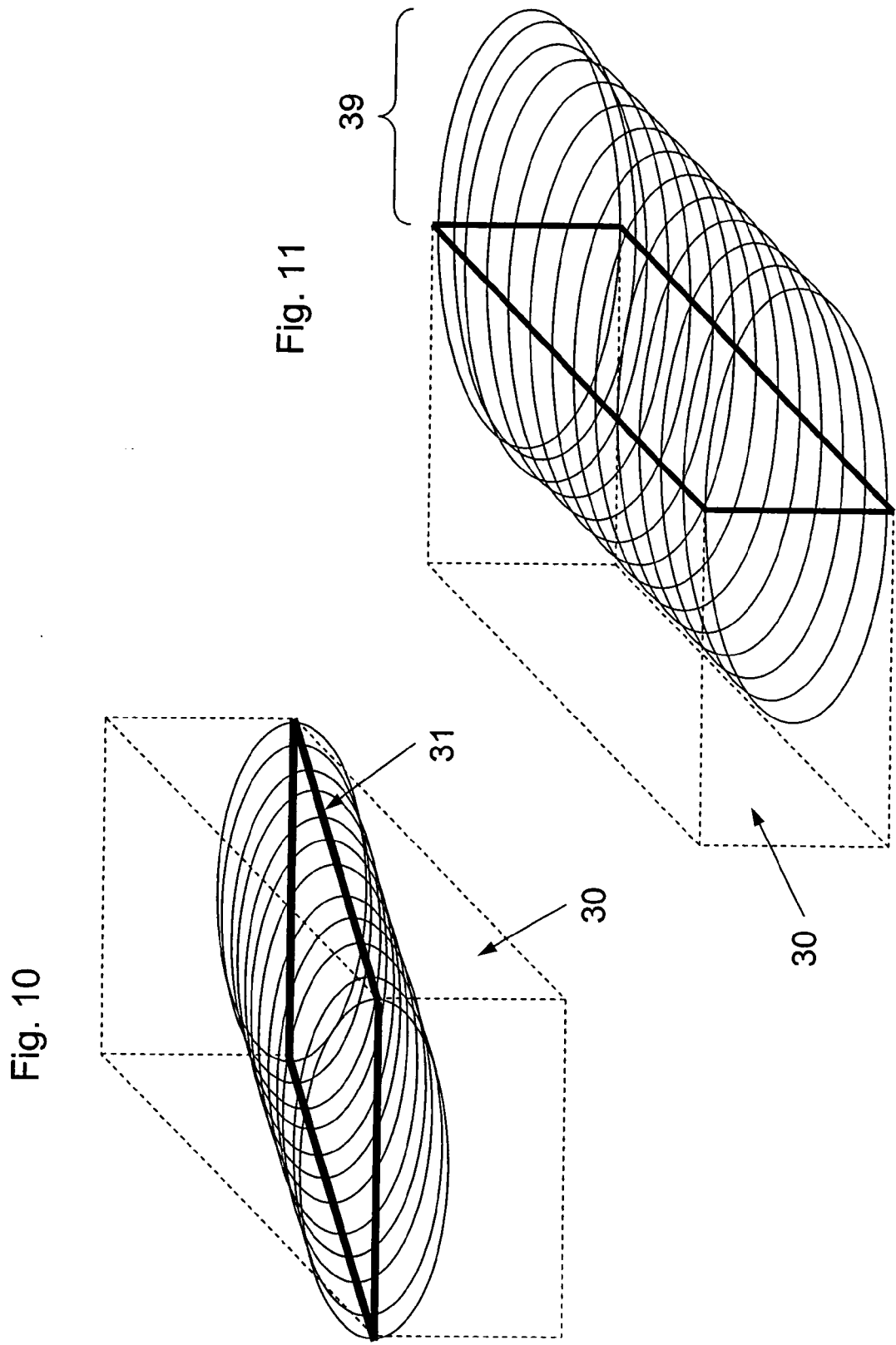

ANTENNA ARRANGEMENT

RELATED APPLICATION

This is a §371 of International Application No. PCT/FR2005/003233, with an international filing date of Dec. 21, 2005 (WO 2006/067336 A1, published Jun. 29, 2006), which is based on French Patent Application No. 04/53126, filed Dec. 21, 2004.

TECHNICAL FIELD

This disclosure relates to the field of contactless reading of RFID tags. The disclosure relates, more specifically, to a network of antennas and a method for reading RFID tags such as to optimize the success rate of read tags.

BACKGROUND

Contactless reading and writing of RFID tags (or radio-frequency identification tags or chips) can only be performed in an arrangement or network of antennas in certain optimal spatial conditions (position of the tag as close as possible to the reading antenna so that the projected surface is as large as possible) and interference conditions (electromagnetic waves other than those of the reading/writing antenna should not interfere).

These conditions are only partially fulfilled by known systems. This results in failures during the reading/writing phases with resulting errors in the management applications.

Already known from U.S. Pat. No. 6,700,547 is a remote interrogation portal using an electromagnetic field comprising an antenna coupled with a remote interrogator to detect when an object or an animal passes in the proximity of the antenna. The device antenna consists, in particular, of two co-planar loops made up of three portions—the top and the two side walls-forming a detection portal. Each part of the antenna is flattened against one side of the passage generating one of the three orthogonal directions of the 3D electromagnetic field produced. However, when the RFID tags are not presented according to one of the three orthogonal axes, the performance is reduced considerably and, in certain positions, it is difficult for the tag to be read by the antenna arrangement. On the other hand, the antennas are not used to their full capability because, since they are co-planar to the contours of the portal, half of the electromagnetic field (the part (1) outside the portal in reference to FIG. 1) is not used.

Also known from U.S. Pat. No. 4,798,175 is a portal for remote interrogation with an electromagnetic field. The device consists of a single antenna loop present on the top and side walls of the portal, the loop being reversed on one of the side walls so as to ensure that the RFID tag is read regardless of the direction in which it passes through the portal. This device is similar to that described above and has the same restrictions.

The antennas used in these two devices are relatively large since they closely follow the contour of the portal.

Also known from U.S. Pat. No. 6,696,954 or US 2002/0044096 is a network of antennas forming a portal or passage type detection area. More particularly, the network of antennas comprises a plurality of antenna loops arranged forming a rectangular network, the antennas transmitting/receiving electromagnetic signals having three-dimensional components. The antennas are also coupled with a processor by means of a filter and selective switches. In reference to FIG. 2 of US '954, the network of antennas comprises three loops, the first 30s, in the plane X-Y, surrounds the passage at the entry or exit thereof. The second and third loops 30v and 30h are placed diagonally (rotation respectively according to axis X and axis Y) along the detection area according to an angle substantially equal to 45° with the plane X-Y. Two independent antennas can also be added on the two side walls of the passage. The arrangement of antennas thus defines the parallelepiped, which is the volume of the detection area. However, the proposed device also has limitations, in particular because it allows an RFID tag to pass through the portal without forming an angle of less than 45°. Moreover, there are positions in which the tag is at an angle of 90° in relation to the two antennas 30v and 30h of the device, in particular when the tag is located at the center of the installation (where it is not subject to the influence of the lateral antennas) which is the most unfavorable scenario for reading or writing the tag. For this reason, the success rate for reading tags is not satisfactory for applications requiring a margin error of less then 1%.

Also known are systems generating a three-dimensional electromagnetic field by using phase changes in the various antennas of the device. This is particularly the case in WO 99/050780, which describes a contactless RFID tag reading device which powers the latter regardless of their position in the space of the induction coil of the circuit attached to the antenna. The device comprises three planar antennas arranged in three orthogonal planes so as to create three orthogonal fields according to the axes of a rectangular trihedron. These antennas are powered by currents in phase with the high-frequency carrier frequency and with amplitude modulated by time functions that can be sinusoidal functions of different frequencies.

Such systems have certain limitations, among others, the complexity of implementing a phase change system. Indeed, numerous parameters (R, L, C, material used, surface and shape of antennas and tags) render the system unstable. For example, for a system A comprising two antennas $A_1$ and $A_2$, each antenna has two electronic adaptation components, ($A_1$, (a, b)) and ($A_2$, (a', b'))+2 components for changing the phase of the system made up of two antennas (A, (a", b")) giving a total of six interdependent parameters to be taken into account at the time of adjustment.

Also known from U.S. Pat. No. 3,689,885 is a system of interdependent antennas since, in practice, one antenna is used to supply energy to an RFID tag and another antenna is used for reading. This dependence requires correct tuning (matching impedance between the antenna and the reader in general at 5052 and 0°) of the antennas in relation to each other to allow the correct operation of the assembly. Such tuning is difficult to obtain, since modifying one antenna also modifies the tuning of the other antennas, this tuning then being obtained by dichotomy after numerous modifications of the various antennas. Since the electromagnetic antennas can "see" each other (which is to say they mutually influence each other), it is desirable to overcome the constraints by using independent antennas, which allow the tags to be powered and read simultaneously.

Also known from US 2003/0209601 is a system for monitoring articles by means of a plurality of stations, which have a network of antennas. Such networks comprise a plurality of vertical, horizontal or sidelong antennas, activated individually and sequentially. This network can be split into several zones (A, B, C, D), in which at the most two antennas (720; 730, 735; 740, 745; 750, 755) read the tags. However, this solution does not allow optimal reading of the RFID tags passing through the arrangement of antennas since, in a given location within the arrangement, it is possible for a tag to pass through it without doing so at a maximum angle of 45° in relation to one of the network antennas, this configuration enabling optimized reading of the tag.

WO 95/14938 discloses a device equipped with several antennas to enable an RFID tag to be identified, located and positioned. The aim of this invention is not to optimize the reading by guaranteeing a high success rate, but rather resides in the means for determining the position of the tag. It should be noted that this solution only uses a single reader for all the antennas, and that it implements antennas with complex geometry (antennas arranged in "C" or "L" formations, page 10).

It could therefore be advantageous to achieve an arrangement of antennas with simple geometry, which is to say flat antennas, minimizing complexity and costs by using a single reader.

Another problem to be dealt with is that, when the antenna surfaces are facing each other, the respective magnetic fields of each of the antennas interfere with one another, producing disturbance phenomena and therefore, incorrect operation. These phenomena, called "mutual magnetic coupling" are of physical nature and it is difficult to compensate for these coupling phenomena in the antennas used in equivalent devices.

U.S. Pat. No. 5,572,226 discloses a device with spherical antennas for contactless reading/writing of RFID tags, as well as a method of successively activating one of the antennas of the device. More particularly, the device switches from one antenna to another while controlling the waking state of the tags that are activated by antenna or the other. This solution depends to a great extent on the response supplied by the tags to the successive requests from each of the antennas. It does not make it possible to comprehend the problem of interference between antennas with substantially parallel surfaces.

SUMMARY

I provide a network of antennas for contactless reading or writing of RFID tags in a detection volume, including three or four flat, independent antennas sequentially connected to a single reader by a switch, wherein: planes of the antennas pass through a reading/writing/detection volume centered in the detection volume, for every pair of antennas, an intersection of their planes is included in the optimal reading/writing volume, and the antennas are arranged so that any direction in the optimal reading/writing volume forms an angle of about 45° or less with at least one of the planes of the antennas.

I also provide a system for detecting RFID tags placed in a detection volume including at least two networks of antennas, wherein the networks of antennas overlap and are offset in relation to one another.

I further provide a method of reading/writing an RFID tag in the network including, when a tag passes through the network, successively and for each of the antennas: tuning the antenna, supplying power to the antenna with a multiplexer controlled by the reader, reading reading/writing the RFID tag, cutting the power supply to the antenna with the multiplexer, and deactivating tuning the antenna.

BRIEF DESCRIPTION OF THE DRAWINGS

My devices will be understood better from the following description, provided merely for the purpose of explanation, of representative example, in reference to the appended drawings:

FIG. 6 is a block diagram;

FIG. 7 shows a system for detecting static tags;

FIGS. 10 and 11 depict the optimal use of the electromagnetic fields of antennas.

DETAILED DESCRIPTION

Figure 1:
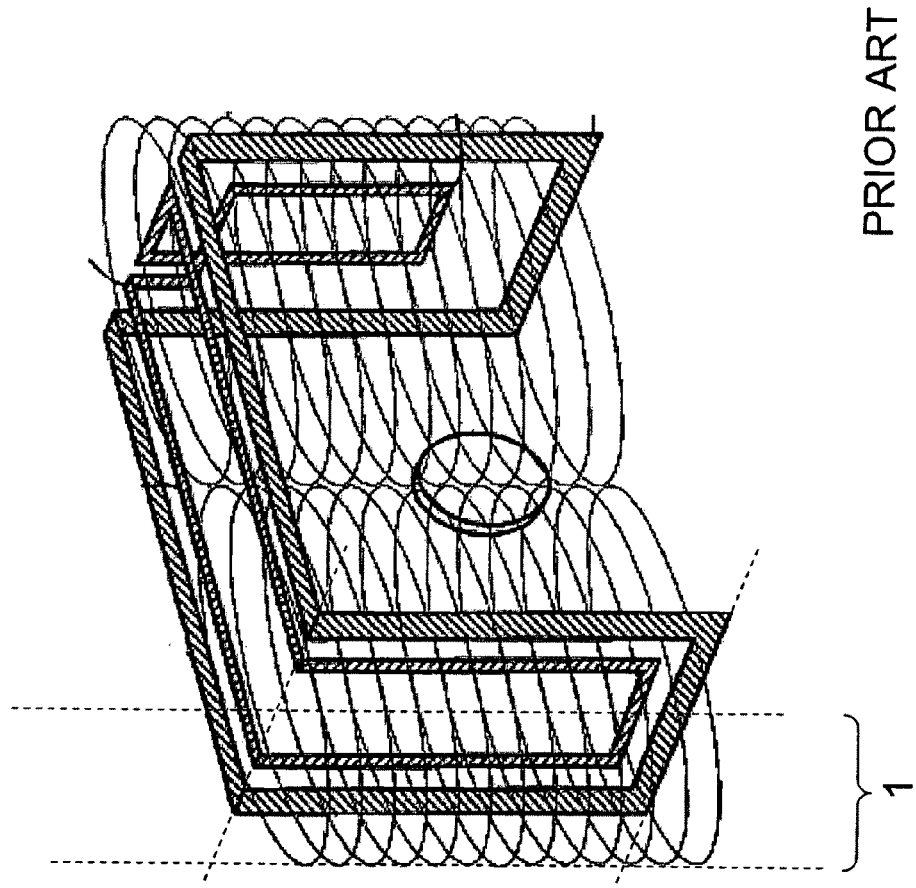
FIGS. 1 and 2 show known devices already described above.
Figure 2:
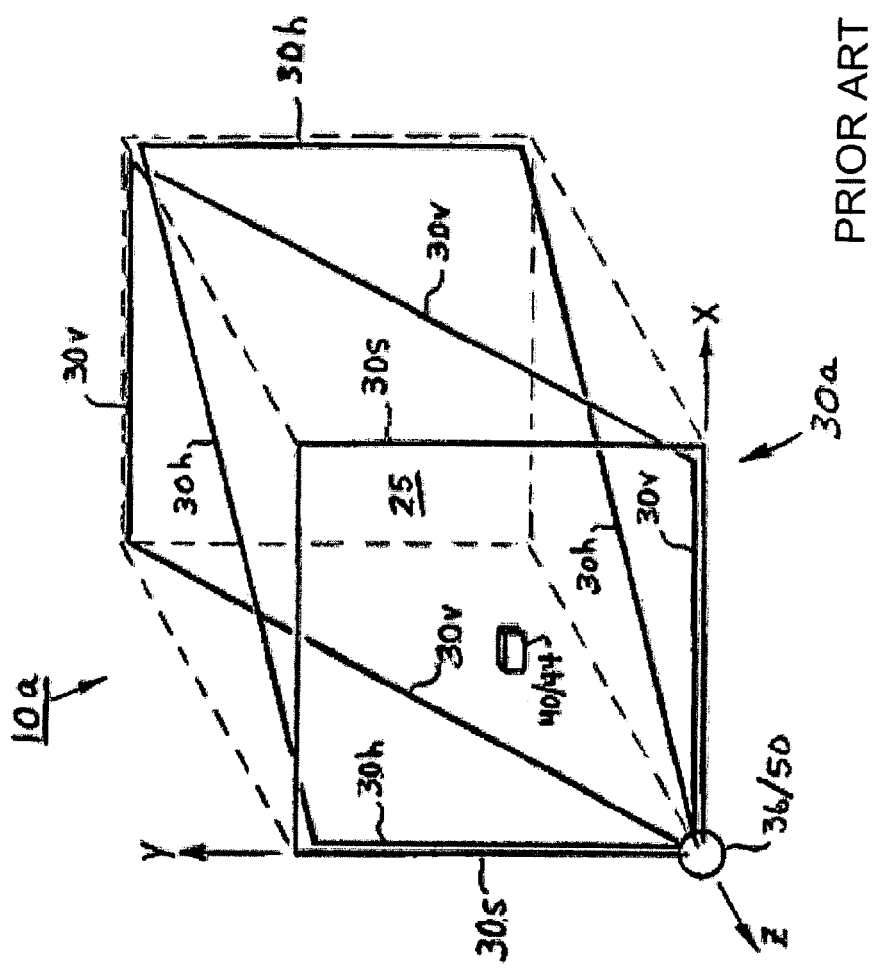

I provide a network of independent electromagnetic antennas passing through the detection volume so that the straight lines intersecting the planes of the antennas two-by-two all pass through a volume of detection centered in the volume defined by the network. Ideally, any RFID tag passing through the area does so at an angle of less than 45° in relation to at least one of the planes of the antennas. This condition of positioning the tag in relation to the antenna ensures that it can be read or written in an optimal fashion.

I also make it possible to increase the detection rate for static RFID tags in a given volume.

I further provide a solution to inter-antenna interference in similar devices by providing means of switching between antennas as well as tuning and detuning means that are specific to each of the antennas, and therefore means of adapting and non-adapting the impedance.

My devices make it possible to:

simplify the construction and implementation of the network by using independent antennas;

reduce the size of the antenna(s) in terms of surface and volume since the antennas are independent, passing through the volume and not following the contour;

make the best use of the detection volume since the two sides of the electromagnetic field of the entire antenna (on either side of the antenna) contribute to this;

have tags which, in the dynamic version, are located in the plane of one of the antennas with a low angle, which is to say less than 45°(and similar in the static version), thus obtaining maximum coupling and optimized reading, in particular in the difficult conditions of coupling between tags in the presence of metal;

reduce the number of antennas for an RFID tag reading rate at least equivalent to the existing devices; and avoid complicated management of antenna sequencing during the movement of an object in the arrangement.

Thus, my devices respond particularly well to the problem of reading tags when presenting a high density thereof. Indeed, when several tags to be read are placed close together and the surface of their antennas is concealed, these are detuned and a very small number of them are read correctly. This group of tags passes through an arrangement of antennas or else the arrangement of antennas (in the case of a fixed tag) passes by it and the reading is carried out in an efficient manner. This is particularly the case of items of clothing placed in boxes, in which the tags associated with the items overlap or are stacked.

My devices also respond well to the problem of reading tags in a highly metallic environment. Indeed, the presence of metal tends to reduce the tag reading distances. I make it possible, by moving the tags in the arrangement or by setting the antennas of the arrangement in independent operation (in the case of a fixed tag), to read the tag.

For this purpose, I provide a network of antennas for contactless reading or writing of RFID tags in a detection volume, comprising three or four flat, independent antennas connected sequentially to a single reader by switching means, characterized in that:

the planes of the antennas pass through an optimal reading/writing/detection volume centered in the detection volume, for every pair of antennas, the intersection of their planes is comprised in the optimal reading/writing volume, and the antennas being arranged so that any direction in the optimal reading/writing volume forms an angle of 45° or less with at least one of the planes of the antennas.

This optimal reading area is defined as the area in which the efficiency of reading en RFID tag, regardless of its position, is above a predefined threshold, for example 99.9%. The dimensions of this area are caused to vary by playing with parameters of the antenna network: supply power, antenna size or the like.

Every intersection of the planes of the antennas, taken two by two, is comprised within the detection area.

According to various aspects:

the intersections cut an optimal detection volume centered in the detection area, the optimal detection volume having a similar cross-section and a surface comprised between 10% and 75% of that of the detection area, thus providing an "ideal or optimal" volume for tag detection, the network comprises three orthogonal antennas offset by 120° around the longitudinal axis of the detection area, the network comprises three square-shaped antennas, the network comprises four rectangular antennas, the detection area is a right-angled parallelepiped and each antenna passes through the detection area from one of the sides of the entrance end of the detection area to the opposite side of the opposite end, the switching means providing an interface between the reader and the antennas are controlled by the reader and make it possible to supply the antennas independently with energy, the network comprises, in addition, shielding against external interference and disturbances, and the optimal reading volume has a width at least equal to the distance traveled by the RFID tag in the network to allow reading of the information it contains.

I also provide a system for detecting RFID tags in a detection volume comprising at least two networks of antennas, the networks of antennas overlapping and being offset in relation to each other.

By "overlapping" it is understood that the networks of antennas are substantially the same size and have substantially identical crossing directions, their intersection defining the detection volume of the system.

In one aspect, the offsets between the networks are substantially equal to the width of the volume of the optimal reading volume in the direction of the offsets.

In another aspect, the reader is capable of controlling the switching means in order sequentially to power the antennas one by one, network after network.

Network with Four Antennas

Figure 3:
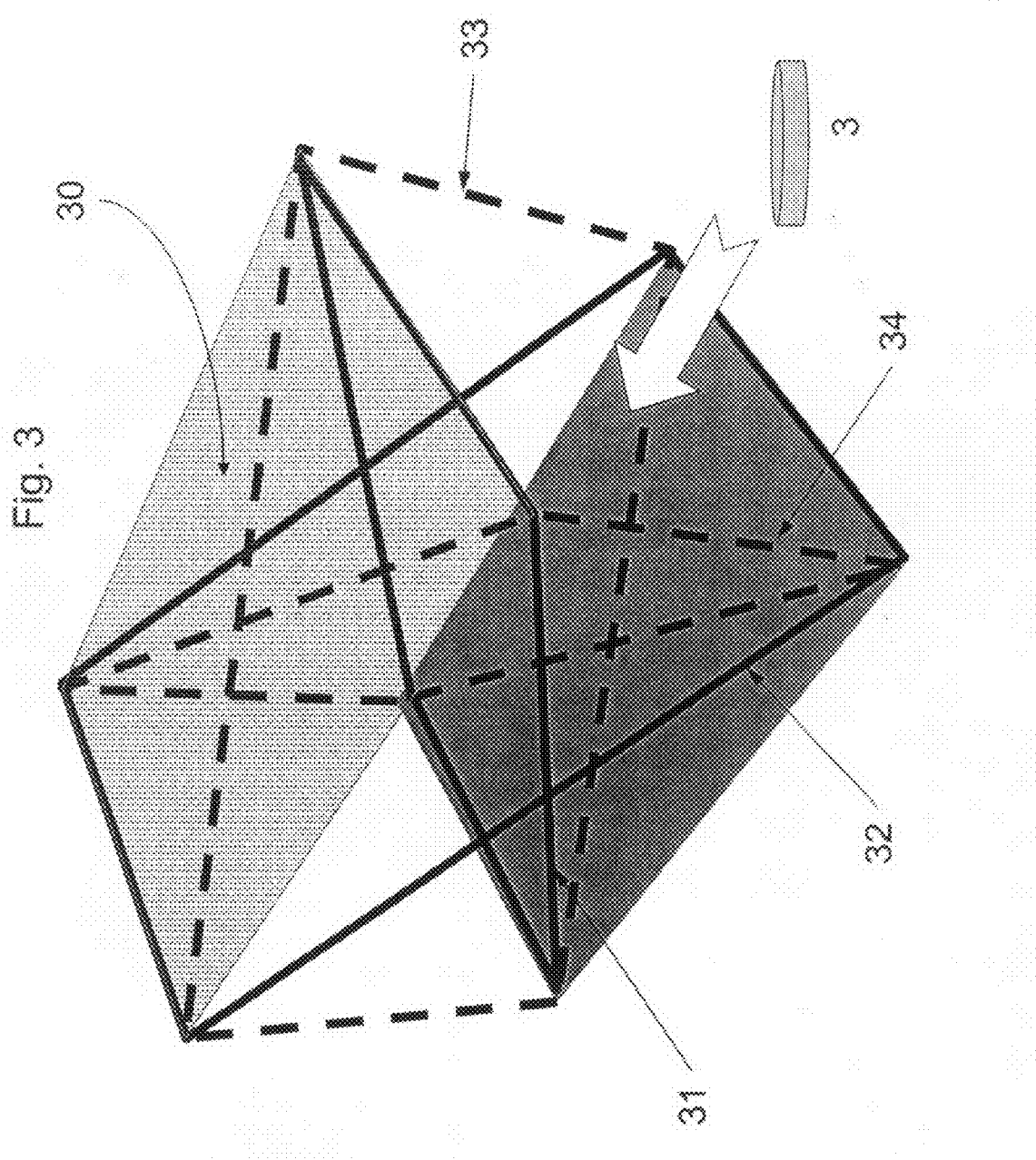
FIG. 3 shows one example of my devices.

In reference to FIG. 3, one representative device comprises four independent flat antennas, in the shape of right-angled and/or elliptical loops, forming a parallelepipedal and/or ovoid detection volume. In general terms, any geometrical shape of the antenna which adapts to the volume to be delimited according to the desired application. "Flat" is understood to mean the antennas in which the strands radiating the electromagnetic field and which are useful for reading the tag are located in the same plane. The plane of the antenna is used to refer to the plane containing the antenna; the inner surface of the antenna refers to the surface of this plane delimited by the antenna.

Figure 4:
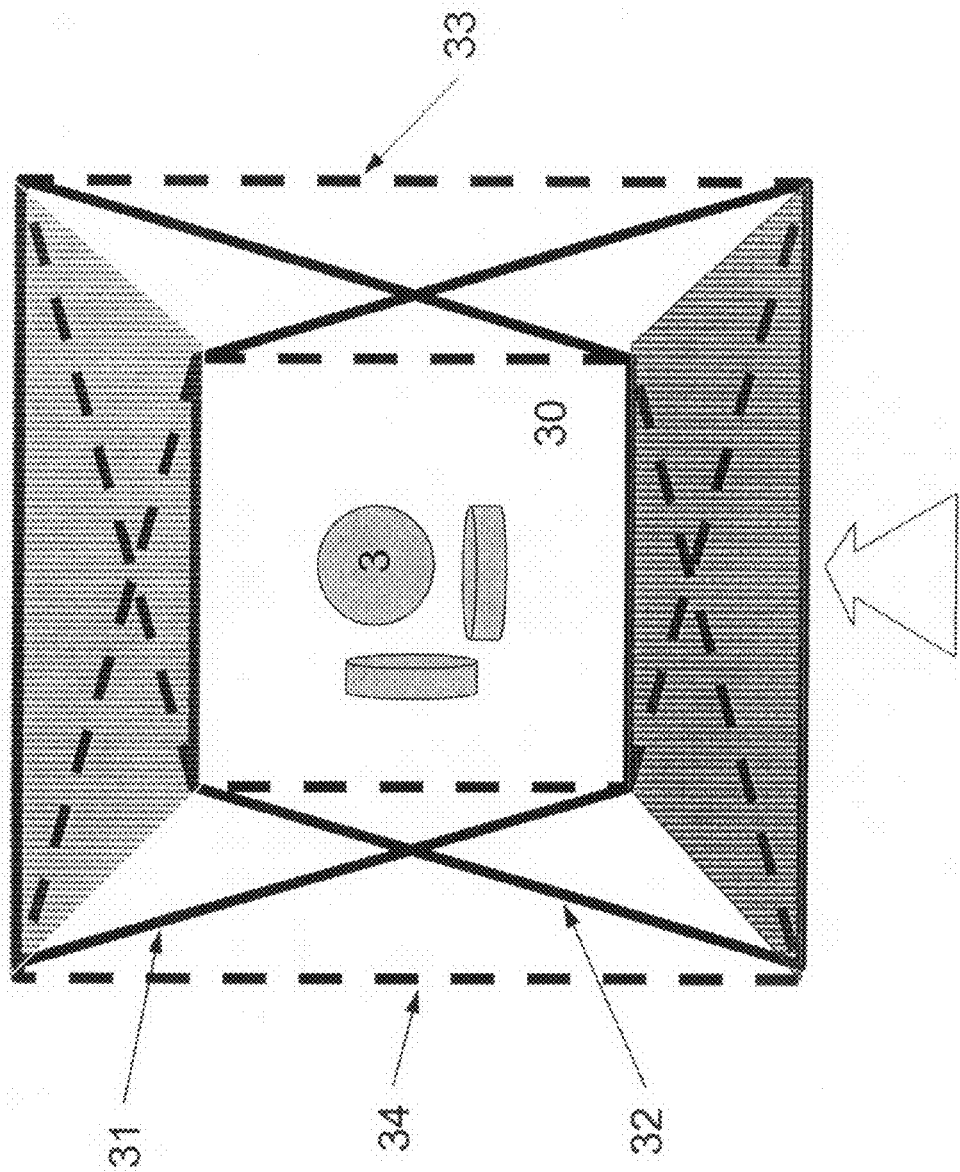
FIG. 4 is a cross-section view of an example of a detection area.

FIG. 4 presents a cross-section view of the detection area (30) delimited by the four antennas (31 to 34) and three RFID tags (3) passing through the area.

The detection area (30) is the smallest regular volume containing the antennas. It is formed by the actual antennas and constitutes, in the present example, a right-angled parallelepiped in which two opposite ends can be compared with an entrance end and an exit end of the zone. One of the aims of the invention is to detect the RFID tags passing through this area, regardless of the position of these tags.

In FIGS. 3 and 4, the four antennas are flat and rectangular in shape.

The network of antennas has two entrance and exit ends by which the RFID tag (3) passes through the device (following the arrow in FIG. 3). These ends have rectangular shapes and are delimited by antenna elements (conductor wires), thereby defining a right entrance edge, a left entrance edge, a top entrance edge (top part) and a bottom entrance edge (bottom part). The entrance end, through which the tag (3) enters the network (right end in FIG. 3) is therefore differentiated from the exit end, opposite it. The network comprises a first antenna (31) passing through the detection area (30) from the top of the entrance end (which is to say that a conductor element of the antenna 31 delimits the top edge of the entrance end) to the bottom of the exit end, which is to say that two opposite sides of the rectangular antenna constitute the top and bottom sides respectively of the entrance and exit of the area. The other two sides of the rectangular antenna each correspond to a diagonal of the two sides of the detection volume. "Passing through" is understood to mean that the plane of the antenna splits the detection volume into two volumes greater than zero. This therefore requires that the antenna does not constitute a side wall (an edge) of the detection wall.

A second antenna (32) passes through the detection area from the bottom of the entrance end to the top of the exit end. In any case, the two antennas (31) and (32) are symmetrical in relation to a horizontal plane splitting the volume into two similar parts and together form a cross.

The second pair of antennas (33) and (34) is also symmetrical according to a vertical plane passing through the middle of the volume.

The antenna (33) passes through the volume from the right entrance side to the opposite side (left) of the exit. Two opposing sides of the antenna form the right and left limits respectively of the entrance and exit of the area, while the other two sides of the antenna each correspond to a diagonal of the ceiling and floor of the detection area.

Likewise, the antenna (34) passes through the volume from the left entrance side to the opposite side (right) of the exit.

The entrance and exit ends may be delimited by one side of each of the four antennas. The tags passing through the detection area (30) enter and exit by these two ends.

In this highly symmetrical configuration, the intersection of the antennas 31 and 32 is a segment connecting the middle of each side wall and the intersection of the antennas 33 and 34, a segment connecting the middle of the ceiling and of the floor of the arrangement. In addition, the intersections between the other combinations of pairs of antennas are the diagonals of the parallelepiped. It can therefore be seen that all the intersections of the antennas cut the center of the parallelepiped. There exists, in the proximity of this point, a privileged area for detection/reading/writing of the tags. This central area is henceforth considered to be an optimal detection, reading or writing area, which all the previously mentioned intersections pass through.

My devices also fulfil the demands for detection of static RFID tags. In reference to FIG. 5, the previously mentioned optimal reading (or detection or writing) area (40) is delimited as a centered trunk of the detection parallelepiped (30). It allows reading of a static (or moving) tag by at least one of the four antennas (31 to 34) regardless of the position of this tag. The dimensions of this area depend on the reading performance of the antennas, namely an optimal reading distance comprised between 10 and 20 cm.

In order for the arrangement of antennas to simultaneously offer good performance for static and dynamic reading (moving tags), the width of this area (40) in the direction of movement of the tags is conditioned by several parameters:

Speed V of movement of the tag,
Time T for reading a tag; the time required to read the tag is around 3 ms, this value varying according to the size of the data in the tag (96 useful bits) and the data transfer speed (100 kbit/s).

It is advisable therefore to choose a width of the area (40) at least equal to V×T.

An optimal dimension for creating this network of antennas is 50×50 cm for detection tunnels for clothes, luggage, articles passing through check-outs (supermarkets) or the like. However, the dimensions of the network can vary across a broad range: tunnel openings with dimensions currently ranging from 30×30 cm to 350×350 cm. Some of the antennas available on the market have dimensions of around 10×2 m. The dimensions, shapes, materials of the antennas, types of tags, tag dimensions and transmission/reception power are some of the parameters that influence the others and do not make it possible to define manufacturing standards.

My devices apply to any frequency belonging to the existing frequency range relating to the detection of objects in an electromagnetic field, for example of radiofrequency type (RF): 13.56 MHz (HF), 915 MHz (UHF) or the like.

In general terms, the radiating power of the antennas is approximately 0.2 to 7 watts for a range of 0 to 150 cm on each side of the antenna according to previously defined dimensional characteristics.

A tunnel with dimensions of 40×40 cm, with a power of 2 W and a working frequency of 13.56 MHz enables writing and reading of ARIO 20 SM passive RFID tags (trade name) with a reading range of up to 40 cm.

Likewise, the 50×50 cm tunnel with a power of 5 W is associated with ARIO 70 SM RFID tags (trade name). It is possible, for example, to use standard antennas with a quality factor comprised between 30 and 200.

In reference to FIG. 11, each of the four antennas of the network passes through the detection area, and the electromagnetic fields on either side of the antenna belong to the detection volume (meaning that the two non-zero volumes are separated by the plane of the antenna). On the other hand, the antennas flattened against the edge of the volume have their external electromagnetic field (39) which is not used for detection (FIG. 12). My devices therefore ensure better use of the antenna resources.

The network applies in particular to the production of detection tunnels, portals (dock doors), detection conveyor belts and any type of system which involves an object passing through an arrangement of antennas in the space having the property of reading and/or writing RFID tags (tube, corridor or the like).

In order to increase its performance, the network of antennas comprises a shielding that protects it against all or part of the interfering noise coming from the outside and against the emission of electromagnetic pollution to the outside (to a user, for example). Such shielding can consist of an external casing matching the shape of the detection volume, leaving the access to the entrance and exit ends free. Such a casing can be made from a ferromagnetic material, for example ferrite, enclosing the network of antennas.

When an RFID tag, a flat antenna with circular winding, passes through the detection area, it passes by at least three antennas due to the previously described specific arrangement.

Thanks to the spatial arrangement of the antennas, any tag passing through this network is presented with a surface tilted by at least 45° in relation to the plane of at least one antenna of the network. This limit of 45° guarantees a projected surface at least equal to 50% of the surface of the tag, this surface portion guaranteeing the reading/detection/writing of the tag; this is called viewing surface between the antenna and the tag.

In reference to FIG. 6 and to reduce/avoid any interference between the various antennas (31, 32, 33, 34) of the network, the latter is equipped with means that act as a switch (5). These switch means are controlled by a control application.

These means (5) make it possible selectively to tune each of the antennas while the others are not powered (detuned). These means are similar to a control device for tuning the impedance between the antennas of the network at 50 ohms with no phase difference (phase difference=0°) and the reader at the resonant frequency of 13.56 MHz. Possibly, these tuning means can be an electronic circuit placed that the base of the antenna with which it is associated, the switch means (5) making it possible to power (and respectively to cut the power to) this circuit in order to tune (and respectively detune) the antenna. The tuning parameters are already set in the electronic circuit, and tuning only consists of applying these parameters in order to make the antenna resonant.

The switching means (5) can be controlled switches independently opening the circuits of the antennas (31 to 34).

Another aspect provides for creating a short circuit in the antennas not used to shift the resonant frequency beyond the duty cycle, thus limiting interference. This, however, remains a stray loop which disrupts and absorbs a part of the electromagnetic field of the antenna used.

The antennas (31 to 34) are supplied with power according to time. For example, each of the antennas is successively powered for a duration $d_{antenna}$ which can vary from one antenna to another. The period of the network at the end of which an antenna is repowered is the sum of the durations $d_{antenna}$ of all the antennas (31 to 34) of the network.

The network is equipped with a single reader (4) for reading the tags passing through it.

This single reader is used for all the antennas in the network. This reader (4) has multiplexing means (MUX) allowing it to be connected successively to the different antennas of the network to supply the electric power the antennas require to detect/read/write the tags. In this way, it acts as a power switch for these antennas. Once connected to an antenna, the reader reads the RFID tags in the proximity of this antenna. The advantage of having a single reader is having, for a similar cost to that of several "simple" readers, greater intelligence (software) for separating the various tags detected (tag separation algorithm).

All the switching (5), multiplexing (MUX) and reading/writing/detection means are controlled by an electronic processor (implementing software, for example) synchronizing the operations as presented above.

When operational:

At t=0 ms, the switch (5) switches on the antenna 31 in order to tune the antenna with the reader. Almost immediately, the multiplexer MUX powers the antenna 31. The reader than performs the necessary reading/writing operations on the tags present in the detection area of the antenna 31.

At t=100 ms, the antenna 31 is detuned by the switch (5) and the power is cut by the MUX. Almost immediately (here, in the case of 100 ms for example in 2 ms corresponding to the time for switching the various electronic elements), the switch (5) makes it possible to tune the next antenna 32 and the MUX supplies the electric power to the antenna.

These operations are successively performed for all the antennas, a cycle time being defined when all the antennas are powered (for example, 400 ms).

By way of example, an arrangement of antennas is multiplexed in the manner described below.

Initially, all the antennas are "open", detuned and the RF power sent is zero.

The reading process starts by detecting the object (via a sensor) equipped with a tag passing through the arrangement of antennas. When receiving data, the control application controls in an adapted manner the switching and reading means.

At Ti, the reader activates the tuning of the antenna 1 by means of a switch that establishes switching between the antenna and a passive circuit near it (the values of the components, in particular the capacitance and inductance values, are specific to the antenna associated to the circuit so that, when the circuit is connected to the antenna, the latter is tuned and operational).

At T2=T1+stabilization time of the antenna relay 1 (around one millisecond), the reader supplies the antenna 1 with RF power by the multiplexer MUX and starts the tag reading/writing/detection phase.

At T3=T2+reading/writing/detection time (of around a hundred ms), the reader cuts the RF/power and the reader deactivates the tuning of the antenna 1.

At T4=T3, the reader activates the tuning of the antenna 2.

At T5=T4+stabilization time of the antenna relay 1 (around one millisecond), the reader supplies the antenna 2 with RF power and starts the tag reading/writing/detection phase.

At T6=T5+reading/writing/detection time (not exceeding one hundred ms), the reader cuts the RF/power and the reader deactivates the tuning of the antenna 2.

The process is repeated in a loop until end-of-reading instructions are received.

The reader controls the single switch in order for it to perform the switching of each of the antennas in the context of activating or deactivating the tuning.

The connection between the antenna and the reader can be established by means of a RG58/50 Ohms or RJ174 cable or by a simple electric wire. The connection of the tuning control box can be provided by means of a shielded twisted cable. The signal type between the antenna and the reader is a voltage that can be, for example 5V (TTL) or 24V, of industrial type.

The power supply to the reader can be around 85V to 250V and the RF power of the antennas can range from around one hundred milliwatts to several watts.

The reader multiplexes the radio part on/off in the context of disconnecting the antenna from the reader.

The multiplexing time depends on the characteristics of the chip used, the type of tag and its performance, the speed at which the tags pass through the arrangement of antennas, the number of tags and the size of the antennas.

It is possible to adapt the working times (for detection/reading/writing) of the antennas according to their applications. For example, for a conveyor belt transporting mainly cardboard boxes with RFID tags affixed on the side of them (tags which are therefore vertical), priority is given to longer working time for the two vertical antennas 33 and 34.

Tests have been conducted on a network with a size substantially equal to 51 cm×51 cm×51 cm. This network is coupled with a conveyor belt for a similar use to that of object analyzers used by airport customs authorities. A bag containing 50 objects with RFID tags is inserted in the detection volume.

With a speed of movement of 25 cm/s, the reading rate is 100%.

At 38 cm/s, 97% of the tags were read and separated, and at 50 cm/s, 95% of the tags were read.

My devices also relate to the detection of static RFID tags in a defined volume.

Figure 5:
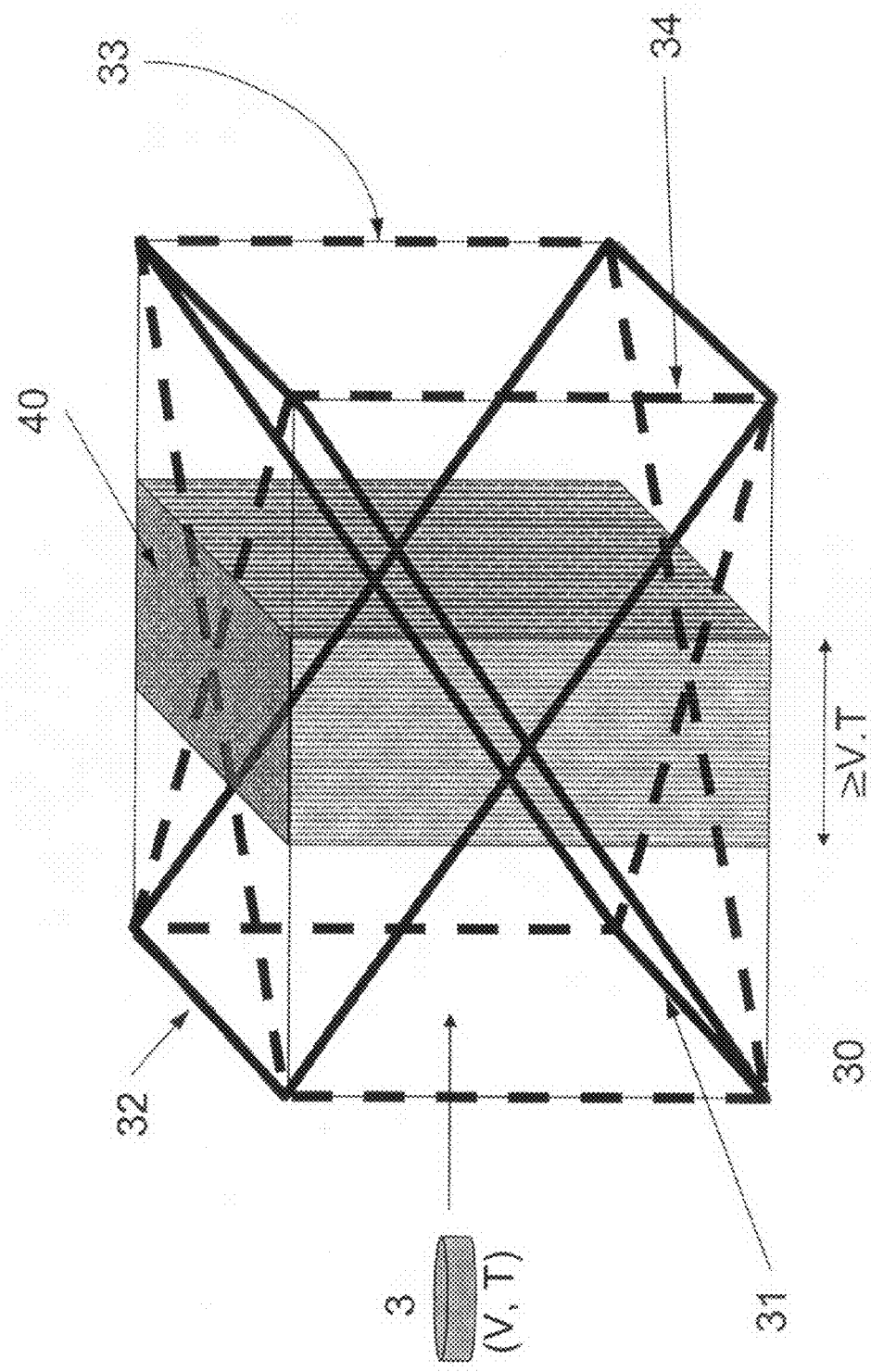
FIG. 5 shows an optimal reading area of a network.

As mentioned previously, the network allows reading of static tags in an optimal reading volume (40 in reference to FIG. 5).

I suggest using at least two networks of antennas such as described previously, arranged so that their optimal reading areas complement each other to cover a larger area.

In reference to FIG. 7, the system is made up of two substantially identical networks of antennas (30a and 30b) placed in the same direction, which is to say that the direction in which the objects pass through both networks are substantially the same, for example, with an angle between the two directions of less than 10°. The two networks are offset in relation to one another by a distance equal to the width of the optimal reading area (40) such as to create two contiguous optimal reading areas with equivalent volumes, thus enlarging the static detection volume of the tunnel: the electromagnetic fields produced by the same antennas of the two networks do not scan the same volume.

This arrangement makes is possible, for every point in the space of the defined volume (all the optimal areas 40), to read the tags regardless of their position (since the reading positions of the first network are added to that of the second network).

For two cubical networks with dimensions of 46 cm and 51 cm overlapped and offset and for a static bag containing 50 articles, tests allowed the identification of 99.5% of all the articles placed in the "double" central area for optimal reading.

A system for detecting static tags can contain as many networks of antennas as required and in arrangements according to all spatial directions to cover a defined volume.

The superposition of antennas belonging to different networks does not pose any difficulty and any known technique can be used.

In this static detection system, the electronic processor controls the switches (5) and MUX in order for the antennas to be powered sequentially one-by-one, network-by-network or in a much more random fashion.

Network with Three Antennas

My devices also apply to arrangements of antennas comprising three antennas and to systems consisting of the arrangement of at least two networks of antennas as previously described. It also provides for mixed networks of antennas (for example, networks with three and four antennas) to be associated in a single detection system so as to increase the optimal detection volume (40).

Three antennas is the optimal number of antennas for forming layouts dedicated to 3D detection/reading/writing of RFID tags.

Figure 8A:
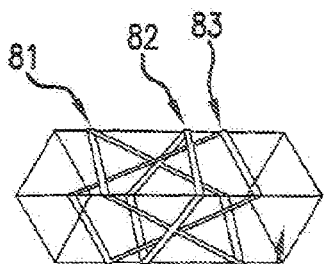
FIGS. 8 and 9 show examples of a network including three antennas.

FIG. 8a shows an example of an embodiment of a network with three antennas for detection in a tunnel (80) with a square cross-section of 100 cm×100 cm.

The conductor elements of the antennas 81, 82 and 83 are co-planar to the planes forming the tunnel (80).

FIGS. 8b to 8e show the drawing of the antennas on the four sides of the tunnel (80) for the network depicted in 8a:
- 8b is the front face (with the drawing of the rear face in dotted lines),
- 8c is the top of the tunnel,
- 8d is the rear face (the front face in dotted lines), and
- 8e is the bottom of the tunnel.

Figure 8B:
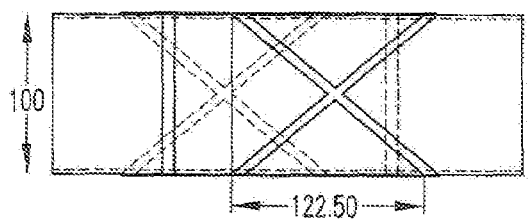
Figure 8C:
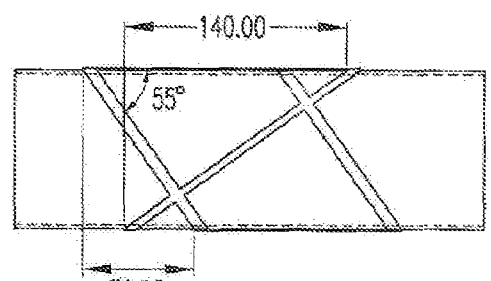
Figure 8D:
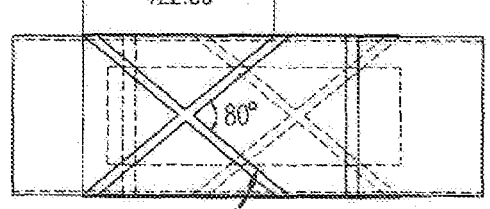
Figure 8E:
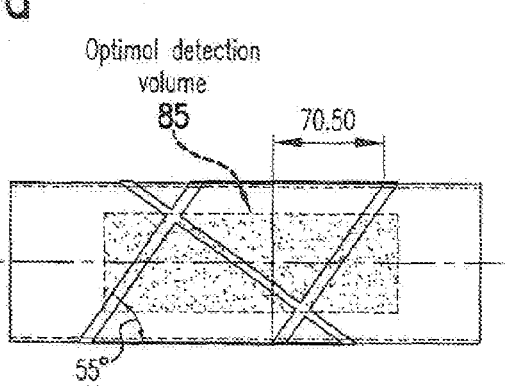

Two antennas forming a quadrilateral "loop" (81 and 82) cut each other on the lateral sides of the tunnel (80), with an angle comprised between 60° and 120°, for example 80°, so that the straight line intersecting their plane passes through the tunnels substantially at mid-height. FIGS. 8b and 8d depict the cross formed by the intersection of the two antennas, the centers of the two crosses forming the straight line of intersection being located substantially at mid-height of the tunnel. "Loop" is taken to mean the fact that the antennas consist of a conductor line (for example, a copper wire) that almost loops onto itself: the shape obtained is therefore almost closed (the two ends of the conductor line are connected to the switching means (5)).

The antennas 81 and 82 are not perpendicular to the longitudinal axis of the tunnel, but form an angle of less than 90°, for example 60°, 45° or 55° as depicted in the example of FIG. 8, with the axis of the tunnel. FIGS. 8c and 8e clearly depict this tilt.

The planes forming these two antennas 81 and 82 therefore cut the tunnel (80) in a slanting fashion.

The third antenna (83) of the network perpendicularly cuts the two antennas 81 and 82 so that the straight lines that intersect the plane of the antennas 81 and 83 as well as 82 and 83 cut the tunnel by passing substantially through an central optimal detection area (85), for example, a parallelepiped with a cross-section of 50% that of the tunnel.

In the example of FIG. 8, the plane of the antenna 83 is vertical, passes through the tunnel in a slanting fashion and its normal is perpendicular to the normal of the planes of the other two antennas.

All the intersections of the antennas of this device pass, once more, through the center of the tunnel, making it possible thereby to find the optimal detection volume (40) centered in the tunnel.

In FIG. 8, any RFID tag passing through the tunnel does so at an angle of 45° or less with one of the antennas: reading is therefore optimized.

Figure 9A:
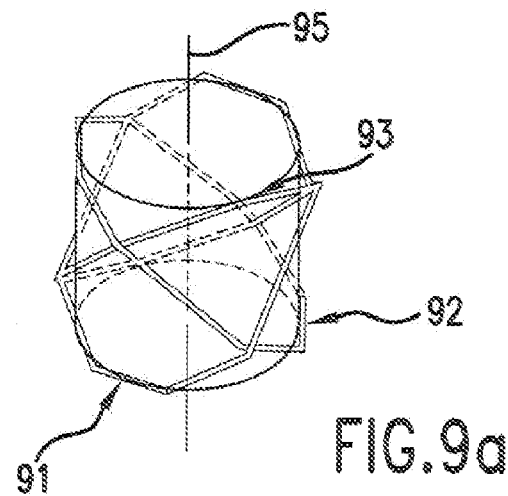
Figure 9B:
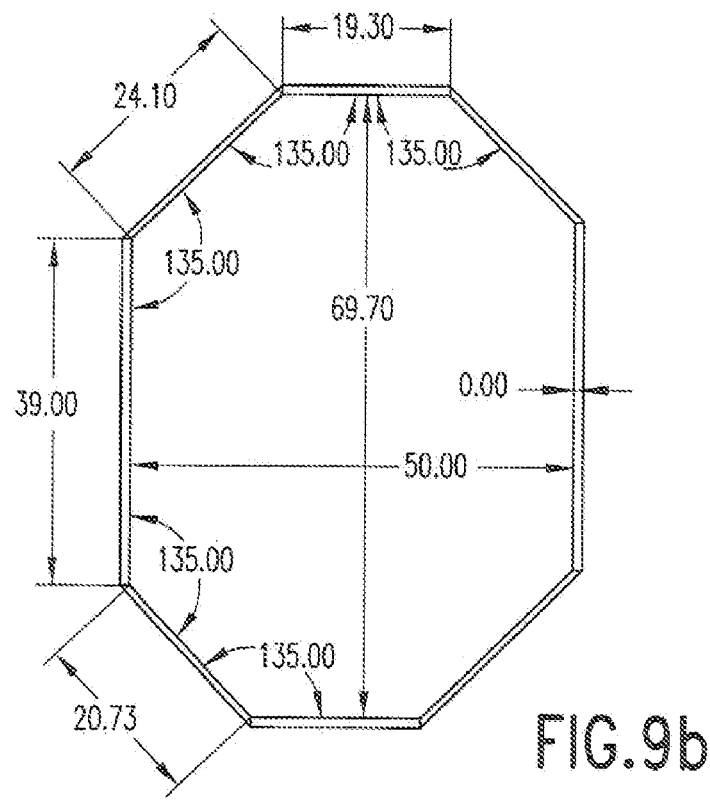

FIG. 9 depicts another example of a network using three antennas (91, 92 and 93).

This example makes it possible to define a detection tunnel (90) with a substantially cylindrical shape and a diameter of 50 cm.

Each of the antennas is an octagonal "loop" in which each of the angles has the value of 135°. The smallest width of the octagon is 50 cm, the greatest length is around 70 cm. The three antennas are identical.

The longitudinal axis (95) of the tunnel (90) passes through the center of each of the antennas, and the large length of each of the antennas is tilted in relation to the longitudinal axis of the tunnel such as to define the radius of the tunnel, for example by an angle of around 45°. The three antennas are arranged symmetrically in the network, each being images of the other by rotation of ±120° around the longitudinal axis (95).

In this way, it can be clearly seen that the intersection of the antennas also pass through the center of the cylinder making it possible to find a centered optimal detection volume.

Any tag passing through the network therefore meets three tilted planes of detection. Thus, the tag is at least read by one of the antennas with an angle of less than 45°.

The invention claimed is:

1. A network of antennas for contactless reading or writing of RFID tags in a detection volume, comprising three or four flat, independent antennas sequentially connected to a single reader by a switch, wherein:
   - planes of the antennas pass through a reading/writing/detection volume centered in the detection volume,
   - for every pair of antennas, an intersection of their planes is comprised in the optimal reading/writing volume, and
   - the antennas are arranged so that any direction in the optimal reading/writing volume forms an angle of about 45° or less with at least one of the planes of the antennas.

2. The network according to claim 1, wherein the optimal detection volume has a similar cross-section and a surface comprised between about 10% and about 75% of that of the detection area.

3. The network according to claim 1, comprising three orthogonal antennas offset by 120° around a longitudinal axis of a detection area.

4. The network according to claim 1, comprising three quadrilateral antennas.

5. The network according to claim 1, comprising four antennas.

6. The network according to claim 5, wherein the antennas are rectangular and a detection area is a right-angled parallelepiped and each antenna passes through the detection area from one side of an entrance end of the detection area to an opposite side of an opposite end.

7. The network according to claim 1, wherein the switch provides an interface between the reader and the antennas are controlled by the reader and make it possible to supply the antennas independently with energy.

8. The network according to claim 1, wherein it comprises, in addition, shielding against external interference and disturbances.

9. A system for detecting RFID tags placed on a detection volume comprising at least two networks of antennas according to claim 1, wherein the networks of antennas overlap and are offset in relation to one another.

10. The system according to claim 9, wherein offsets between the networks are substantially equal to the width of the volume of the optimal reading volume in a direction of the offsets.

11. The system according to claim 9, wherein the reader is capable of controlling the switch sequentially to supply the antennas one by one, network after network.

12. A method of reading/writing an RFID tag in the network according to claim 1, comprising, when a tag passes through the network, successively and for each of the antennas:
   - tuning the antenna,
   - supplying power to the antenna with a multiplexer controlled by the reader, reading reading/writing the RFID tag, cutting the power supply to the antenna with the multiplexer, and deactivating tuning the antenna.

13. The method according to claim 12, wherein tuning or deactivating the tuning comprises switching with the switch the antenna of the arrangement with an associated passive circuit for activating or deactivating the tuning.

14. The method according to claim 12, further comprising a prior step of detection, by a sensor connected to the switch and to the reader, of a tag in the network.

* * * * *